United States Patent [19]
Wessels et al.

[11] Patent Number: 5,663,556
[45] Date of Patent: Sep. 2, 1997

[54] OPTOELECTRONIC FERROELECTRIC SENSOR AND SIGNAL GENERATING DEVICE

[75] Inventors: Bruce W. Wessels, Wilmette; Bruce A. Block, Chicago, both of Ill.

[73] Assignee: Northwestern University, Evanston, Ill.

[21] Appl. No.: 480,282

[22] Filed: Jun. 7, 1995

Related U.S. Application Data

[63] Continuation-in-part of Ser. No. 398,419, Mar. 2, 1995.
[51] Int. Cl.$^6$ .................................. H01J 40/14
[52] U.S. Cl. ................... 250/214.1; 250/338.2; 374/161
[58] Field of Search ............... 250/214 R, 214.1, 250/458.1, 338.2, 227.11, 484.1, 591; 374/131, 161, 29, 30; 313/503, 505, 497, 49 P

[56] References Cited

U.S. PATENT DOCUMENTS

| | | | |
|---|---|---|---|
| 4,592,664 | 6/1986 | Bijlenga et al. | 250/227.11 |
| 4,782,227 | 11/1988 | Micheron et al. | 250/214.1 |
| 5,453,661 | 9/1995 | Auciello et al. | 313/497 |

OTHER PUBLICATIONS

Time Decay Study Of The $Er^{3+}$-Related Luminescence In $In_{1-x}Ga_xP$; Mat. Sci. forum, vol. 143–147, pp. 743–738; Ostapenko, et al., Jan. 1994.
Rare Earth Doped Fiberglass and Amplifier; Rare Earth Doped Glasses: Optical Properties, W. J. Miniscalco, ed. by M.J. F. Digonnet, one page. (no date).
Determination Of The Low–Frequency Linear Electro–Optic Effect In Tetragonal $BaTiO_3$; J. of the Optical Soc. of America, vol. 55, No. 7, Jul., 1965, pp. 828–834; Johnston, et al.
Oscillator Strengths, Quantum Efficiencies, And Laser Cross Sections Of $Yb^{3+}$ and $Er^{3+}$ in III–V Compounds; J. Appl. Phys. 66(8), Oct. 15, 1989, pp. 3952–3955; Auzel, et al.
Epitaxial Growth Of $BaTiO_3$ Thin Films By Organometallic Chemical Vapor Deposition; Appl. Phys. Lett. 60 (1), Jan. 6, 1992, pp. 41–43; Wills, et al.
Photoluminescence Decay Of 1.54µm $Er^{3+}$ Emission In Si and III–V Semiconductors; Electronics Letters, vol. 24, No. 24, Nov. 24, 1988.
Photoluminescence Characterization Of Er–Implanted $Al_2O_3$ Films; Appl. Phys. Lett. 62 (24), Jun. 14, 1993, G.N. van den Hoven, pp. 3065–3067.
The Influence Of Ionic Radii On The Incorporation Of Trivalent Dopants Into $BaTiO_3$; M. Sci. Eng. B1 193–201; Xue et al., Jun. 1988.
$Er^{3+}$ Doping Of $CaF_2$ Layers Grown By Molecular Beam Epitaxy; Appl. Phys. Lett. 62(21), May 24, 1993, pp. 2616–2618, E. Daran, et al.
Rendering Barium Titanate Semiconductive By Doping With Rare–Earth Elements; Ferroelectrics, vol. 83, pp. 187–191, N. V. Dergunova, et al., Feb. 1988.
Growth Studies Of Ferroelectric Oxide Layers Prepared By Organometallic Chemical Vapor Deposition; J. Crys. Grow. 107, Jan. (1991) pp. 712–715, L. A. Willis, et al.
Second–Harmonic Generation Of Poled $BaTiO^3$ Thin Films; Appl. Phys. Lett. 62 (12), Mar. 22, 1993, pp. 1314–1316, H. A. Lu H. A. Lu, et al.

(List continued on next page.)

*Primary Examiner*—Que Le
*Attorney, Agent, or Firm*—Edward J. Timmer

[57] ABSTRACT

An optoelectronic temperature sensor comprises a doped ferroelectric oxide thin film that exhibits a detectable change in luminescence intensity with temperature as a result of an oxide phase transition when the sensor is heated or cooled through a particular temperature range. The phase of the doped ferroelectric oxide affects the intensity of the luminescence emitted by the doped ferroelectric oxide and thereby provides a temperature dependent parameter or output. The optoelectronic temperature sensor of the present invention can comprise a rare earth or transition metal doped ferroelectric oxide thin film.

12 Claims, 2 Drawing Sheets

OTHER PUBLICATIONS

Photoluminescence Properties Of $Er^{3+}$-Doped $BaTiO_3$ Thin Films; Appl. PHys. Lett 65 (1), Jul. 4, 1994, pp. 25–27, B. A. Block, et al.

Electronic Beam Induced Poling Of $BaTiO_3$ Thin Films; Appl. Phys. Lett. 63 (7), Aug. 16, 1993, pp. 874–876, H.A. Lu, et al.

Nd:MgO:LinbO₃ Spectroscopy And Laser Devices; J. Opt. Soc. Am. B., vol. 3, No. 1, Jan. 1986, pp. 140–146, T. Y. Fan et al.

Er–Diffused Ti:$LiNbO_3$Waveguide Laser Of 1563 And 1576 nm Emission Wavelengths; Appl. Phys. Lett. 61 (11), Sep. 14, 1992, pp. 1257–1259, P. Becker, et al.

Method For The Local Incorporation Of Er Into $LiNbO_3$ Guided Wave Optic Devices By Ti Co–Diffusion; Appl. Phys. Lett. 60 (9), Mar. 2, 1992, pp. 1067–1069, D.M. Gill, et al.

Structual, Magntic And Transport Properties Of $R_x Ba_{1-x} TiO_{3\delta}$ Solid Solutions, Where R = La, Nd, Gd, Er, and Y: Rare Earth Dependent Metal–To–Semiconductor Transitions; Chem Mater. 4, pp. 1038–1046, Cahit Eylem, et al., Jan. 1992.

OPTOELECTRONIC FERROELECTRIC SENSOR AND SIGNAL GENERATING DEVICE

This application is a continuation-in-part of application Ser. No. 08/398 419 filed Mar. 2, 1995, pending.

CONTRACTURAL ORIGIN OF THE INVENTION

This invention was made with Government support under grant Number: DMR-9120521 awarded by the National Science Foundation. The Government may have certain rights in the invention.

FIELD OF THE INVENTION

The present invention relates to optoelectronic sensors and, more particularly, to an optoelectronic ferroelectric temperature sensor that exhibits temperature dependent luminescence that can be monitored by a detector to provide a temperature dependent signal.

BACKGROUND OF THE INVENTION

Ferroelectric oxide thin films are of interest as dielectric materials and are useful in numerous electronic, electro-optic, and acoustical-optic applications. Ferroelectric oxide materials of interest have included both titanates and niobates which can be made as thin films by RF sputtering and more recently by organometallic chemical vapor deposition (OMCVD) as set forth by L. A. Wills et al. in "Growth studies of ferroelectric oxide layers prepared by organometallic chemical vapor deposition", Journal of Crystal Growth, 107, pp. 712–715 (1991).

There also has been considerable recent interest in the fabrication of rare earth doped thin films for optically active waveguides for integrated optics applications. Since rare earth ions exhibit a characteristic intra-4f shell luminescence emission that is both nearly host and temperature independent, rare earth doped ferroelectric oxides have been of particular interest as offering the possibility of simple optical devices that take advantage of the electro-optical and nonlinear optical (NLO) properties of ferroelectric oxides as well as the optical gain of the rare earth ions.

Optical devices, such as self-frequency-doubled, self-Q-switched, and self-modulated lasers in addition to amplified integrated optical circuits with no insertion losses are possible using rare earth doped ferroelectric oxides. Erbium-doped ferroelectric oxides have been of special interest as optically active components due the characteristic $Er^{3+}$ emission at 1.54 microns, which corresponds to the minimum loss in silica based optical fibers. For example, planar waveguides and devices, including self-frequency doubled devices and lasers operating at 1.54 microns have been fabricated from rare earth doped lithium niobate ($LiNbO_3$) bulk single crystals. Lithium niobate, however, exhibits several inherent limitations. First, the solubility of erbium ions (Er+) in the lithium niobate host material appears to be relatively low. Second, photo-refractive optical damage of the lithium niobate host can limit the efficiency and usefulness of lithium niobate based waveguides and optical devices. Third, optical waveguides comprising erbium doped lithium niobate can only be made from bulk single crystal material, which is itself difficult to make, and requires a slow, costly diffusion or ion implanation treatment to render it waveguiding and also to include the erbium dopant therein.

Copending patent application Ser. No. 08/398 419 of common inventorship and assignee herewith describes a method of making an optical working medium, such as a thin film optical wave guide, by doping a ferroelectric oxide film in-situ as it is deposited on a substrate in a reactor by OMCVD. For example, a barium-bearing reactant, titanium bearing reactant, rare earth-bearing reactant, and oxygen reactant are provided in proper proportions in the reactor and reacted under temperature and pressure conditions to deposit on a substrate, such as an oxidized silicon or a $LaAlO_3$ substrate, a rare earth doped barium titanate film, such as Er doped $BaTiO_3$.

An object of the present invention is to provide an optoelectronic temperature sensor comprising a doped ferroelectric oxide that exhibits a temperature dependent luminescence.

Another object of the present invention is to provide an optoelectronic temperature sensitive signal-generating device that monitors the change in luminescence intensity of a doped ferroelectric oxide with temperature changes and provides a temperature dependent electrical signal representative of temperature change.

SUMMARY OF THE INVENTION

The present invention provides an optoelectronic temperature sensor comprising a doped ferroelectric oxide that exhibits a detectable change in luminescence intensity with temperature relative to a threshold intensity level as a result of a phase transition of the doped oxide when the sensor is heated or cooled through a particular temperature range. The phase of the doped ferroelectric oxide determines in part the intensity of the luminescence emitted by the impurity doped ferroelectric oxide. Upon undergoing a phase transition, the luminescence intensity changes and thereby provides a temperature dependent parameter or output.

The optoelectronic temperature sensor of the present invention can comprise a rare earth or transition metal doped ferroelectric oxide to provide a characteristic rare earth metal or transition metal luminescence when optically excited. Exemplary doped ferroelectric thin film temperature sensors include an Er doped or Cr transition metal doped barium titanate thin film deposited by OMCVD on a substrate.

The present invention also provides an optoelectronic temperature sensitive signal-generating device that includes the aforementioned doped ferroelectric oxide temperature sensor to provide temperature dependent luminescence intensity and a detector, such as, for example, a photodetector, for monitoring change in the intensity of luminescence output of the sensor and providing a temperature dependent electrical signal. For example, a change in the luminescence of the ferroelectric oxide sensor relative to a threshold intensity level due to a phase transition in a particular temperature range can be detected by the detector to produce an electrical signal to actuate a suitable electrical switch. The present invention thereby provides a temperature sensitive switch.

The above and other objects and advantages of the present invention will become more readily apparent from the following detailed description taken with the following drawings.

DESCRIPTION OF THE INVENTION

The following detailed description of the invention is offered for purposes of illustrating the present invention in greater detail and not limiting the scope of the invention.

The present invention provides an optoelectronic temperature sensor comprising a doped ferroelectric oxide that exhibits a change in luminescence intensity with temperature (e.g. upon heating or cooling through a particular temperature range) relative to a threshold intensity level as a result of a phase transition of the doped oxide associated with the particular temperature range. An optoelectronic temperature sensor in accordance with one embodiment of the invention comprises a ferroelectric oxide thin film doped with photoluminescent centers (dopant) preferably selected from a rare earth metal or transition metal. The doped ferroelectric oxide emits a characteristic luminescence associated with the particular dopant upon optical excitation by appropriate wavelength light (e.g. from a laser or other light source). The luminescence efficiency of the doped ferroelectric oxide will depend, in part, on the state of the oxide lattice in which the luminescent centers (dopant) reside.

In accordance with the present invention, the doped ferroelectric oxide temperature sensor is selected to exhibit a phase transition, such as change in the crystal structure, of the oxide lattice in a temperature range of interest that will affect the luminescent intensity of the film to a detectable degree. An exemplary doped ferroelectric oxide temperature sensor comprises rare earth metal (e.g. Er) or transition metal (e.g. Cr) doped barium titanate which undergoes a phase transition (change in crystal structure) when the oxide is heated or cooled through a particular temperature range of interest.

In particular, an Er doped barium titanate (Er doped $BaTiO_3$) thin film temperature sensor is useful in a temperature range that encompasses temperatures from about 190K to 300K where the doped barium titanate exhibits a phase transition between rhombohedral phase and orthorhombic phase in that range. Such a phase transition strongly quenches (reduces) or enhances the intensity of luminescence as the thin film is cooled or heated, respectively, from below about 230K to above about 300K, or vice versa.

Figure 1:
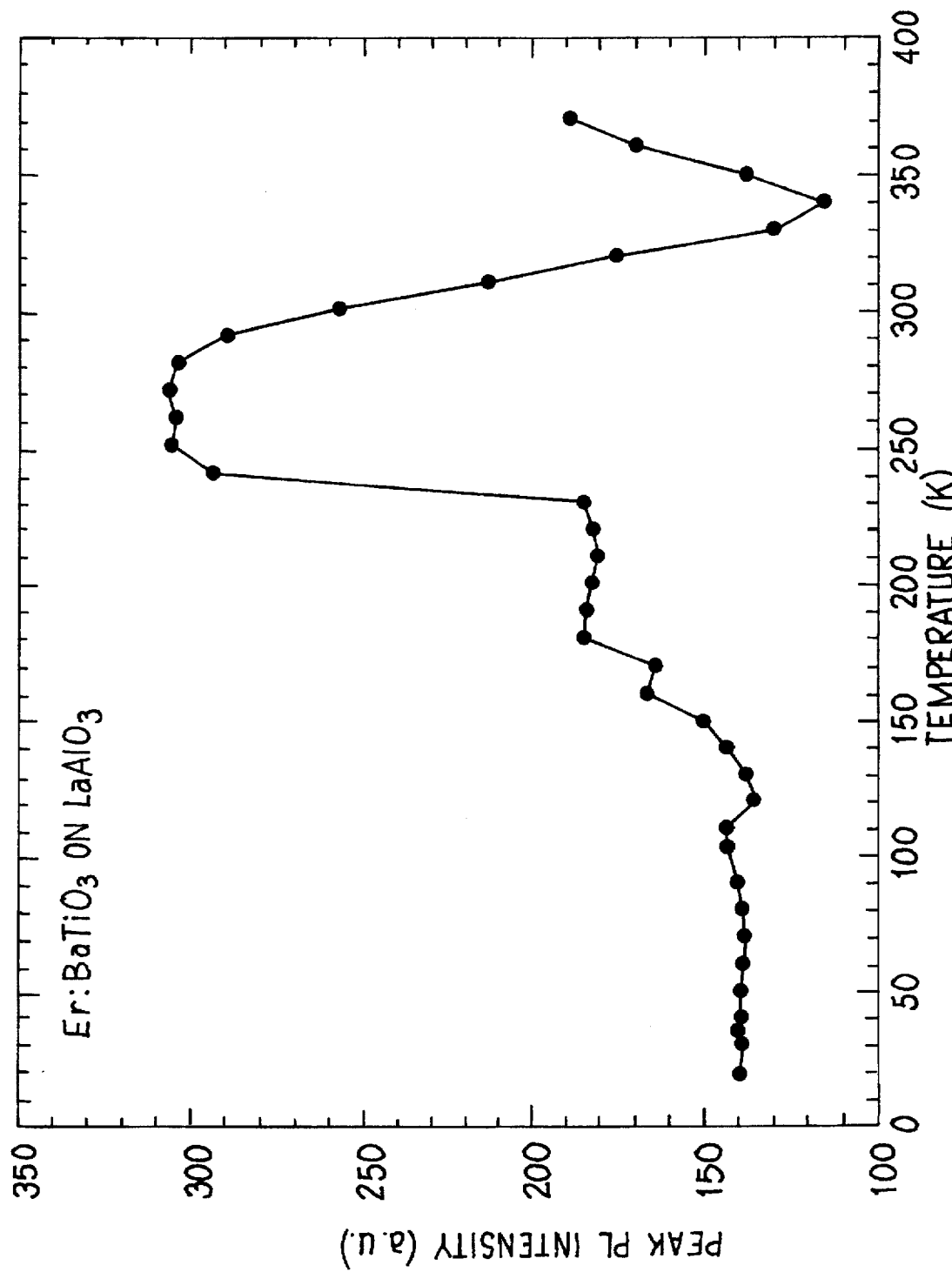
FIG. 1 is a graph illustrating the variation of the Er photoluminescence intensity versus temperature of Er doped barium titanate thin film temperature sensor.

For example, referring to the FIG. 1, the variation of photoluminescence intensity of an Er doped barium titanate temperature sensor pursuant to the invention with temperature is illustrated. FIG. 1 reveals a substantial increase or decrease in luminescent intensity as the Er doped barium titanate thin film is heated through the temperature range of about 230K to 300K. The data points represented by circles in FIG. 1 were measured during heating. The photoluminescence (PL) measurements were made using the unfiltered light (514 nm, 488 nm, etc. where nm is nanometer) from an Ar+ laser with a power output up to 0.1 Watt. The luminescence was dispersed through a Zeiss MM12 monochromator, which was focused onto a liquid nitrogen cooled Ge detector. Standard lock-in techniques were used for the signal analysis.

It is apparent that when the temperature of the Er doped barium titanate thin film temperature sensor passes through the range (230K to 300K), either upon heating or cooling, there is detectable increase or decrease in the Er photoluminescent intensity due to the phase transition whereby the $BaTiO_3$ undergoes a structural change. The phase of the Er doped barium titanate thus strongly affects the intensity of the Er luminescence emitted by the doped barium titanate ferroelectric temperature sensor proximate this temperature range and thereby provides a temperature dependent parameter or output that can be monitored.

The temperature sensor whose luminescent intensity is plotted in FIG. 1 as a function of temperature comprised an Er doped barium titanate thin film deposited by OMCVD on a $LaAlO_3$ substrate to a film thickness of about 0.3 to about 0.6 micron. Compositional analysis of the deposited Er doped barium titanate film was performed with a Rigaku X-ray powder diffractometer using Ni-filtered Cu K alpha radiation. The analysis indicated that the film was epitaxial. Energy dispersive X-ray analysis indicated that the Er was incorporated in the host film at estimated concentrations on the order of several atomic percent; e.g. Er present at $10^{21}$ $cm^{-3}$.

In general, in practicing OMCVD to deposit a thin ferroelectric oxide film temperature sensor pursuant to the invention, reactants (i.e. metalorganic precursors) bearing the film components (e.g. barium, titanuim, rare earth, and oxygen) are provided in a reactor and reacted in proportions and under conditions of temperature and pressure controlled to deposit a thin ferroelectric film that is doped in-situ with the dopant metal as the film is grown or deposited on the substrate. Typically, the Er dopant is included in an amount of at least about 0.01 atomic percent in a thin barium titanate film, although the invention is not to be so limited. Metalorganic chemical vapor deposition apparatus described by L. A. Wills et al. in *Journal of Crystal Growth*, 107, pp. 712–715 (1991), the teachings of which are incorporated herein by reference, and the aforementioned copending application Ser. No. 08/398 419 can be used in the practice of the present invention to deposit the rare earth metal or transition metal doped barium titanate thin film on a suitable substrate.

The aforementioned Er doped barium titanate thin film on the $LaAlO_3$ substrate was OMCVD'ed using the following precursors:

Ba(hexafluoracetylacetonate)2(tetraglyme)
titanium tetraisopropoxide [TPT; $Ti(OC_3H_7)_4$], and
tris-tetramethylheptanedionate erbium [$Er(thd)_3$].

The Ba and Er solid sources were placed in separate reactor Source zones in the manner shown in the aforementioned L. A. Wills technical article and resistively heated. The liquid TPT was stored in a bubbler that was heated by a recirculating bath (not shown). Argon (high purity) was used as a carrier gas to bring the metalorganic precursors into the reactor zone in proper proportions. Oxygen (high purity) bubbled through deionized water was used as the reactant gas for reacting with the metalorganic precursors. The argon and oxygen flow rates were controlled by mass flow controllers (MFC). Pressure gages were used at appropriate locations of the apparatus. The reactor pressure was set by the total flow rate. An IR (infrared radiation) lamp was used to heat a SiC coated susceptor on which the substrate was placed in the reaction zone to provide an appropriate substrate film growth temperature of 800 degrees C. The deposition temperature was monitored by chromel-alumel thermocouple placed inside the susceptor.

The Er doped barium titanate thin film temperature sensor of FIG. 1 was grown on single crystal $LaAlO_3$ substrate. However, the invention is not limited to this substrate and other substrates can used in practicing the invention. For example, other substrates can be used, such as MgO, Si, and others. Deposition conditions that can be used to produce the Er doped $BaTiO_3$ thin film temperature sensor of FIG. 1 are shown in Table I and also described in aforementioned copending application Ser. No. 08/398 419, the teachings of which are incorporated herein by reference.

TABLE I

| Growth temperature | | 700–850 degrees C. |
|---|---|---|
| pressure (Torr) | | 1–10 |
| temperature of Ba(hfa)$_2$ (tetraglyme) | (°C.) | 115–120 |
| temperature of Er(thd)$_3$ | (°C.) | 90–110 |
| temperature of TPT bubbler | (°C.) | 20–45 |
| temperature of water bubbler | (°C.) | 20 |
| total flow rate (sccm) | | 120 |
| oxygen flow rate (sccm) | | 50 |

Figure 2:
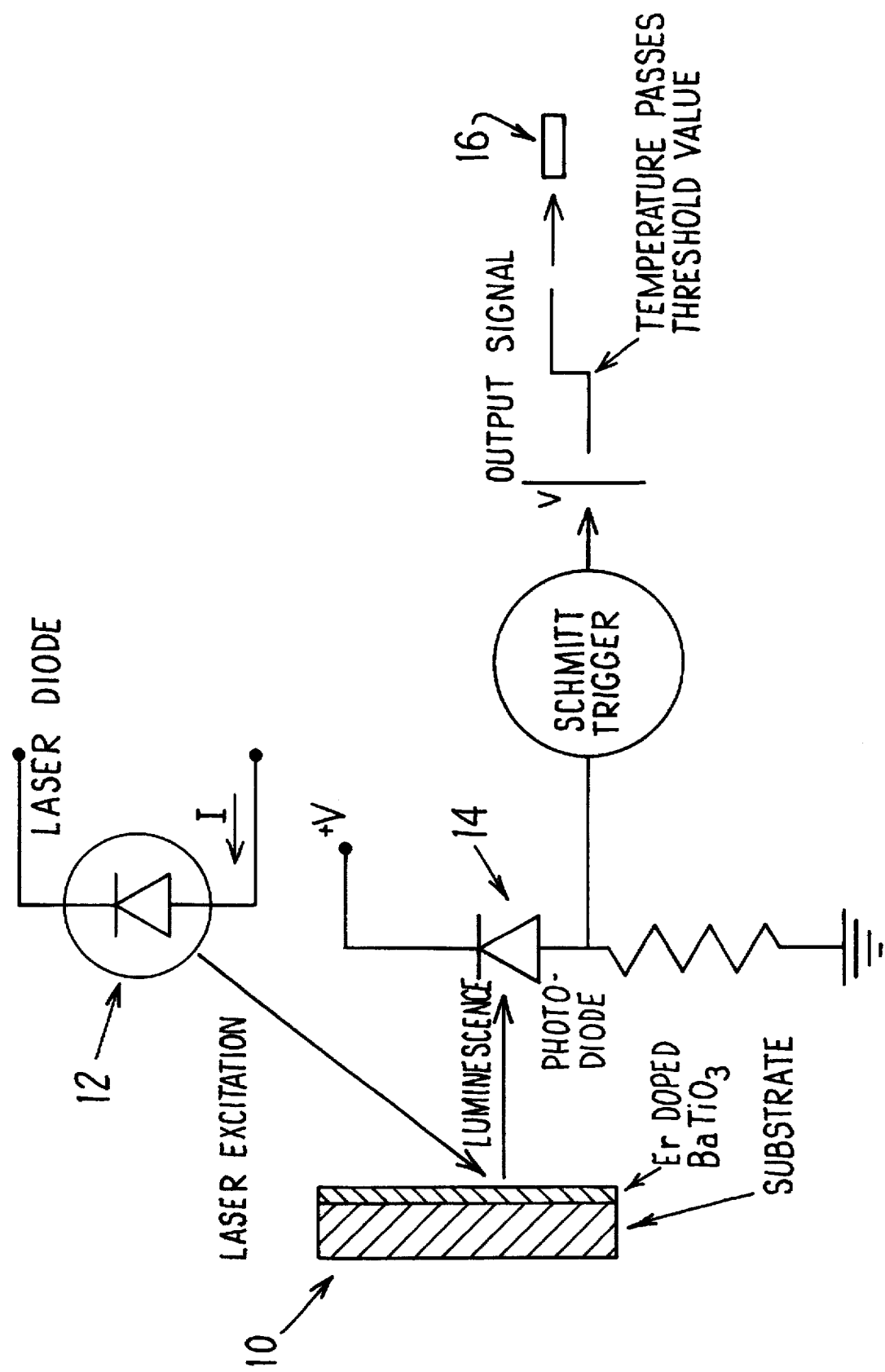
FIG. 2 is a schematic illustration of a temperature sensitive signal generating device and switch in accordance with an embodiment of the invention.

Referring to FIG. 2, an optoelectronic temperature sensitive signal-generating device in accordance with an embodiment of the invention is illustrated and includes a doped ferroelectric oxide temperature sensor 10 as described hereabove to provide temperature dependent luminescence intensity, a light source 12 for optically exciting the doped ferroelectric oxide sensor 10, and a detector 14, such as, for example, a photodetector such as the photodiode and Schmitt trigger shown, for monitoring change in the intensity of luminescence output of the sensor 10 with temperature changes and providing a temperature dependent electrical signal to an electrical switch 16 (shown schematically). In FIG. 2, the temperature dependent signal passes through a threshold value as shown upon an increase in luminescence of the Er doped BaTiO$_3$ thin-film on the substrate (e.g. see FIG. 1 where an increase occurs at 240K and a decrease occurs at 300K).

The light source 12 can be either a laser light source with narrow emission tuned to an absorption band (e.g. a laser diode as shown in FIG. 2) or a broad emission light source.

For example, a decrease in the luminescence of the doped ferroelectric oxide sensor 10 relative to a threshold level, see FIG. 1, due to a phase transition as the temperature is increased or decreased relative to the phase transition temperature region (i.e. 230K to 300K in FIG. 1) is detected by the luminescence detector 14. In reponse to this decrease in luminescence, the detector 14 produces an electrical signal to actuate the electrical switch 16. A conventional Schmitt trigger type of switch responsive to such photodetector signal can be used to further control another electrical component, such as an electrical relay.

Although certain specific embodiments and features of the invention have been described hereabove, it is to be understood that modifications and changes may be made therein without departing from the spirit and scope of the invention as defined in the appended claims.

What is claimed is:

1. Optoelectronic temperature sensor, comprising a doped ferroelectric oxide sensor element that exhibits a detectable change in luminescence intensity with temperature as a result of a phase transition of the doped ferroelectric oxide when the sensor element is heated or cooled through a particular temperature range and means for measuring the change in luminescence intensity.

2. The optoelectronic temperature sensor of claim 1 wherein the ferroelectric oxide sensor element is a thin film doped with a photoluminescent dopant selected from a rare earth metal or transition metal.

3. The optoelectronic temperature sensor of claim 2 wherein the ferroelectric oxide comprises BaTiO$_3$.

4. The optoelectronic temperature sensor of claim 2 wherein the rare earth metal is Er.

5. Optoelectronic temperature sensor, comprising an Er doped ferroelectric oxide thin film sensor element that exhibits a detectable change in luminescence intensity with temperature as a result of a phase transition of the doped ferroelectric oxide when the sensor element is heated or cooled through a particular temperature range and means for measuring the change in luminescence intensity.

6. Optoelectronic temperature sensitive signal-generating device, comprising a doped ferroelectric oxide temperature sensor element that provides temperature dependent change in luminescence intensity as a result of a phase transition of the doped ferroelectric oxide when the sensor element is heated or cooled through a particular temperature range and a detector for monitoring the change in the intensity of luminescence of said sensor and providing a temperature dependent electrical signal.

7. The optoelectronic temperature sensitive signal-generating device of claim 6 wherein said temperature sensor element comprises a doped ferroelectric oxide thin film that exhibits a detectable change in luminescence intensity with temperature as a result of a phase transition when the sensor is heated or cooled through a particular temperature range.

8. The optoelectronic temperature sensitive signal-generating device of claim 7 wherein the ferroelectric oxide thin film sensor element is doped with a photoluminescent dopant selected from a rare earth metal or transition metal.

9. The optoelectronic temperature sensitive signal-generating device of claim 8 wherein the ferroelectric oxide is doped with Er.

10. The optoelectronic temperature sensitive signal-generating device of claim 6 wherein the detector is a photodetector.

11. The optoelectronic temperature sensitive signal-generating device of claim 6 further including an electrical component actuated in response to said electrical signal of said detector.

12. The optoelectronic temperature sensitive signal-generating device of claim 11 wherein the component is a switch.

* * * * *